(12) United States Patent
Langlois et al.

(10) Patent No.: US 9,598,529 B2
(45) Date of Patent: Mar. 21, 2017

(54) PROCESS FOR THE PREPARATION OF LIGNIN BASED POLYURETHANE PRODUCTS

(71) Applicant: ENERLAB 2000 INC., St-Mathieu-de-Beloeil (CA)

(72) Inventors: Armand Langlois, Mont-Saint-Hilaire (CA); Michel Drouin, Beloeil (CA)

(73) Assignee: ENERLAB 2000 INC., St-Mathieu-de-Beloeil, QC (CA)

( * ) Notice: Subject to any disclaimer, the term of this patent is extended or adjusted under 35 U.S.C. 154(b) by 0 days.

(21) Appl. No.: 14/911,648

(22) PCT Filed: Jul. 31, 2014

(86) PCT No.: PCT/CA2014/050724
§ 371 (c)(1),
(2) Date: Feb. 11, 2016

(87) PCT Pub. No.: WO2015/021541
PCT Pub. Date: Feb. 19, 2015

(65) Prior Publication Data
US 2016/0194433 A1 Jul. 7, 2016

Related U.S. Application Data

(60) Provisional application No. 61/865,358, filed on Aug. 13, 2013.

(51) Int. Cl.
| | | |
|---|---|---|
| C08G 18/28 | (2006.01) | |
| C08G 18/64 | (2006.01) | |
| C08G 18/66 | (2006.01) | |
| C08G 18/76 | (2006.01) | |
| C08G 18/79 | (2006.01) | |
| C08G 18/16 | (2006.01) | |
| C08G 18/18 | (2006.01) | |
| C08G 18/24 | (2006.01) | |
| C08G 18/32 | (2006.01) | |
| C08G 18/38 | (2006.01) | |
| C08G 18/42 | (2006.01) | |
| C08H 7/00 | (2011.01) | |
| C08L 97/00 | (2006.01) | |
| C08G 18/08 | (2006.01) | |
| C08K 3/00 | (2006.01) | |
| C08L 75/04 | (2006.01) | |
| C08G 101/00 | (2006.01) | |

(52) U.S. Cl.
CPC ..... *C08G 18/6492* (2013.01); *C08G 18/0838* (2013.01); *C08G 18/14* (2013.01); *C08G 18/165* (2013.01); *C08G 18/168* (2013.01); *C08G 18/1808* (2013.01); *C08G 18/246* (2013.01); *C08G 18/3218* (2013.01); *C08G 18/3281* (2013.01); *C08G 18/3806* (2013.01); *C08G 18/4211* (2013.01); *C08G 18/6655* (2013.01); *C08G 18/7664* (2013.01); *C08G 18/797* (2013.01); *C08H 6/00* (2013.01); *C08K 3/0058* (2013.01); *C08L 75/04* (2013.01); *C08L 97/005* (2013.01); *C08G 2101/005* (2013.01); *C08G 2101/0008* (2013.01); *C08G 2101/0025* (2013.01); *C08G 2120/00* (2013.01); *C08G 2150/00* (2013.01); *C08G 2170/00* (2013.01)

(58) Field of Classification Search
CPC C08G 18/6492; C08G 18/14; C08G 18/0838; C08G 18/168; C08G 75/04; C08G 2101/0025; C08G 2101/0008; C08G 2150/00; C08G 2170/00; C08G 2120/00; C08K 3/0058
See application file for complete search history.

(56) References Cited

U.S. PATENT DOCUMENTS

| | | |
|---|---|---|
| 3,072,634 A | 1/1963 | Santelli et al. |
| 3,577,358 A | 5/1971 | Santelli et al. |

(Continued)

FOREIGN PATENT DOCUMENTS

| | | |
|---|---|---|
| CA | 1050013 A | 3/1979 |
| CA | 1097617 A | 3/1981 |

(Continued)

OTHER PUBLICATIONS

Thring et al., "Polyurethanes from Alcell (R) lignin", Biomass and Bioenergy, vol. 13, No. 3, (1997), pp. 125-132.

(Continued)

*Primary Examiner* — John Cooney
(74) *Attorney, Agent, or Firm* — Baker & Hostetler LLP

(57) ABSTRACT

A process for the production of a lignin based polyurethane products is provided. The process comprises mixing at least one dried lignin and at least one isocyanate to form a lignin-isocyanate mixture, and submitting the lignin-isocyanate mixture to a polymerization reaction. The polymerization reaction may include heating the lignin-isocyanate mixture, adding at least one catalyst to the lignin-isocyanate mixture, or mixing the lignin-isocyanate mixture with a resin comprising at least one polyol, in the presence of at least one catalyst. The lignin based polyurethane products obtained by the process may be rigid foams, flexible foams, rigid boards, rigid blocks, coatings, packagings, adhesives, binders, sealants, elastomers, Thermoplastic Polyurethanes or Reaction Injection Moldings. There is also provided a mixture comprising at least one dried lignin and at least one isocyanate for use in the production of a lignin based polyurethane products.

26 Claims, No Drawings

(56) References Cited

U.S. PATENT DOCUMENTS

| | | |
|---|---|---|
| 3,956,261 A | 5/1976 | Lin |
| 4,017,474 A | 4/1977 | Glasser et al. |
| 4,032,483 A | 6/1977 | Hartman |
| 4,292,214 A | 9/1981 | Blount |
| 4,317,752 A | 3/1982 | Blount |
| 4,383,078 A | 5/1983 | Blount |
| 4,918,167 A | 4/1990 | Glasser et al. |
| 4,987,213 A | 1/1991 | Hirose et al. |
| 5,102,992 A | 4/1992 | Glasser et al. |
| 5,173,530 A | 12/1992 | Andreola et al. |
| 5,204,176 A | 4/1993 | Seiss et al. |
| 5,688,835 A | 11/1997 | Scherbel et al. |
| 5,834,529 A | 11/1998 | Reese et al. |
| 5,885,394 A | 3/1999 | Scherzer et al. |
| 5,981,612 A | 11/1999 | Keppeler et al. |
| 6,025,452 A | 2/2000 | Kurple |
| 6,054,562 A | 4/2000 | Kurple |
| 6,274,642 B1 | 8/2001 | Rotermund et al. |
| 6,319,962 B1 | 11/2001 | Singh et al. |
| 7,129,291 B2 | 10/2006 | Blount |
| 8,022,257 B2 | 9/2011 | Li et al. |
| 8,053,566 B2 | 11/2011 | Belanger et al. |
| 2005/0014919 A1 | 1/2005 | Hatakeyama et al. |
| 2007/0254973 A1 | 11/2007 | Emge et al. |
| 2009/0062516 A1 | 3/2009 | Belanger et al. |
| 2009/0143495 A1 | 6/2009 | Nozawa et al. |
| 2010/0227151 A1 | 9/2010 | Rowlands et al. |
| 2010/0280140 A1 | 11/2010 | Morley et al. |
| 2011/0054059 A1 | 3/2011 | Li et al. |
| 2011/0098384 A1 | 4/2011 | Blount |
| 2011/0262733 A1 | 10/2011 | Roosen et al. |
| 2012/0010313 A1 | 1/2012 | Tomovic et al. |
| 2012/0022240 A1 | 1/2012 | Belanger et al. |
| 2012/0202907 A1* | 8/2012 | Kurple .................. C08L 97/005 521/170 |
| 2013/0102694 A1* | 4/2013 | Keaton ................ B01J 31/2217 521/118 |
| 2013/0281582 A1 | 10/2013 | Dorgan et al. |

FOREIGN PATENT DOCUMENTS

| | | | |
|---|---|---|---|
| CA | 2052487 A1 | 4/1992 | |
| CA | 2164467 A1 | 6/1996 | |
| CA | 2164490 A1 | 6/1996 | |
| CA | 2697469 A1 | 3/2009 | |
| CA | 2733528 A1 | 2/2010 | |
| CA | 2749613 A1 | 7/2010 | |
| EP | 0342781 A2 | 11/1989 | |
| FR | 2689366 A1 | 10/1993 | |
| JP | 57170739 A | 10/1982 | |
| WO | 8607070 A1 | 12/1986 | |
| WO | 9724362 A1 | 7/1997 | |
| WO | 2011062472 A1 | 5/2011 | |
| WO | 2011097719 A1 | 8/2011 | |
| WO | 2011112923 A9 | 9/2011 | |
| WO | 2013179251 A1 | 12/2013 | |
| WO | 2014044234 A1 | 3/2014 | |

OTHER PUBLICATIONS

Hatakeyama et al., "Thermal and mechanical properties of polyurethane-based geocomposites derived from lignin and molasses", Composites: Part A 36 (2005), pp. 698-704.

Hatakeyama, "Thermal Analysis of Environmentally Compatible Polymers Containing Plant Components in the Main Chain", Journal of Thermal Analysis and Calorimetry, vol. 70 (2002), pp. 755-795.

Hatakeyama et al. "Thermal Properties of Lignin-and Molasses-Based Polyurethane Foams", Journal of Thermal Analysis and Calorimetry, vol. 92 (2008), No. 2, pp. 419-424.

Ni, "The Synthesis of Polyurethanes from Non-Modified Lignin Using a Polymerization Catalyst", Master of Science in Engineering Thesis, The University of New Brunswick, 1999, 192 pages.

PU Magazine, "Enerlab advances the use of lignin in PIR boardstock", vol. 9, No. 6, Dec./Jan. 2012/2013, pp. 363.

Cateto et al., "Rigid Polyurethane Foams from Lignin Based-Polyols", IVth International Conference on Times of Polymers (TOP) and Composites, 2008, pp. 243-245.

Zheng et al., "Rapid Liquefaction of Wood in Polyhydric Alcohols Under Microwave Heating and its Liquefied Products for Preparation of Rigid Polyurethane Foam", The Open Materials Science Journal, 2011, vol. 5, pp. 1-8.

Lee et al. "Biodegradable Polyurethane Foam from Liquefied Waste Paper and Its Thermal Stability, Biodegradability, and Genotoxicity", Journal of Applied Polymer Science, vol. 83, 2002, pp. 1482-1489.

Glasser, et al., "Engineering Plastics from Lignin—11. Hydroxypropyl Lignins as Components of Fire Resistant Foams", Polymer Bulletin, vol. 12, 1984, pp. 1-5.

Bykov, "Characterization of Natural and Technical Lignins using FTIR Spectroscopy", Master Thesis, Lulea University of Technology, 2008, pp. 1-41.

Rojas et al., "Lignin Separation from Kraft Black Liquors by Tangential Ultrafiltration", La Chimica e l'Industria, Anno 88, No. 1, 2006, pp. 88-95.

Yoshida et al. "Kraft Lignin in Polyurethanes I. Mechanical Properties of Polyurethanes from a Kraft Lignin-Polyether Triol-Polymeric MDI System", Journal of Applied Polymer Science, vol. 34, 1987, pp. 1187-1198.

Yoshida et al. "Kraft Lignin in Polyurethanes. II. Effects of the Molecular Weight of Kraft Lignin on the Properties of Polyurethanes from a Kraft Lignin-Polyether Triol-Polymeric MDI System", Journal of Applied Polymer Science, vol. 40, 1990, pp. 1819-1832.

Kubo et al., "Kraft Lignin/Poly(ethylene oxide) Blends: Effect of Lignin Structure on Miscibility and Hydrogen Bonding", Journal of Applied Polymer Science, vol. 98, 2005, pp. 1437-1444.

Holmqvist, "Lignin fuel from kraft black liquor—Optimisation of design and operating conditions", Department of chemical engineering, Lund Institute of Technology, pp. 1-4.

Toledano, "Comparative study of lignin fractionation by ultrafiltration and selective precipitation", Chemical Engineering Journal, vol. 157, 2010, pp. 93-99.

Wallberg, "Design of ultrafiltration process for extraction of lignin from kraft black liquor", Internal Report, Department of chemical engineering, Lund Institute of Technology, 2005, pp. 1-8.

Lebo et al., "Lignin", Kirk-Othmer Encyclopedia of Chemical Technology, vol. 15, 2001, pp. 1-32.

Malutan et al., "Lignin modification by epoxidation" BioResources, vol. 3, No. 4, 2008, pp. 1371-1376.

Cateto et al., "Lignins as Macromonomers for Polyurethane Synthesis: A Comparative Study on Hydroxyl Group Determination", Journal of Applied Polymer Science, vol. 109, 2008, pp. 3008-3017.

Hatakeyama et al., "Mechanical and Thermal Properties of Rigid Polyurethane Foams Derived from Sodium Lignosulfonate Mixed with Diethylene-, Triethylene-and Polyethylene Glycols", Macromol. Symp., vol. 197, 2003, pp. 171-180.

Cateto et al., "Monitoring of lignin-based polyurethane synthesis by FTIR-ATR", Industrial Crops and Products, vol. 27, 2008, pp. 168-174.

Cateto et al., "Optimization Study of Lignin Oxypropylation in View of the Preparation of Polyurethane Rigid Foams", Ind. Eng. Chem. Res., vol. 48, No. 5, 2009, pp. 2583-2589.

Hreczuch et al., "Oxyethylation and Oxypropylation of Low Molecular Alcohols", Ind. Eng. Chem. Res., vol. 38, No. 6, 1999. pp. 2225-2230.

Nadji et al., "Oxypropylation of Lignins and Preparation of Rigid Polyurethane Foams from the Ensuing Polyols", Macromolecular Materials and Engineering, vol. 290, 2005, pp. 1009-1016.

Pan et al., "Effect of replacing polyol by organosolv and kraft lignin on the property and structure of rigid polyurethane foam", Biotechnology for Biofuels, vol. 6, No. 12, 2013, pp. 1-10.

Liu et al., "Performance characterization of rigid polyurethane foam with refined alkali lignin and modified alkali lignin", Journal of Forestry Research, vol. 20, No. 2, 2009, pp. 161-164.

(56) References Cited

OTHER PUBLICATIONS

Wang et al., "Polycaprolactone Based Biodegradable Polyurethanes", Macromol. Symp., vol. 197, 2003, pp. 255-264.
Mosiewicki et al., "Polyurethane Foams Obtained from Castor Oil-based Polyol and Filled with Wood Flour", Journal of Composite Materials, vol. 43., No. 25, 2009, pp. 3057-3072, first published on Oct. 6, 2009 as vol. 0., No. 00, 2009, pp. 1-16.
Cheradame et al., "Polyurethane from Kraft Lignin", British Polymer Journal, vol. 21, No. 3, 1989, pp. 269-275.
Bonini et al., "Polyurethanes and Polyesters from Lignin", Journal of Applied Polymer Science, vol. 98, 2005, pp. 1451-1456.
Asano et al., "Preparation and Physical Properties of Sodium Lignosulfonate-and Saccharide-based Rigid Polyurethane Foams" Memoirs of Fukui University of Technology, vol. 32, Part 1, 2002, pp. 275-282.
Lora et al., "Recent Industrial Applications of Lignin: A Sustainable Alternative to Nonrenewable Materials", Journal of Polymers and the Environment, vol. 10, Nos. 1/2, 2002, pp. 39-48.
Asano et al., "Rigid Type Polyurethane Foams Containing Saccharide and Lignin Structures in the Molecular Chain", Memoirs of Fukui University of Technology, vol. 33, Part 1, 2003, pp. 275-282.
Nakamura et al., "Thermal Properties of Solvolysis Lignin-derived Polyurethanes," Polymers for Advanced Technologies, vol. 3, 1992, pp. 151-155.
European Search Report issued in European Patent Application No. 14836359.1 mailed May 18, 2016.
Evtuguin, et al., "Polyurethanes Based on Oxygen-Organosolv Lignin", Eur. Polym. J., Pergamon Press Ltd. Oxford, GB, vol. 34, No. 8, pp. 1163-1169, Aug. 1, 1998.

\* cited by examiner

PROCESS FOR THE PREPARATION OF LIGNIN BASED POLYURETHANE PRODUCTS

REFERENCE TO RELATED APPLICATIONS

This application is the U.S. national stage of International Application No. PCT/CA2014/050724, filed Jul. 31, 2014, which claims the priority of U.S. Provisional Application No. 61/865,358, filed Aug. 13, 2013, the disclosures of which are all incorporated herein by reference in their entireties.

TECHNICAL FIELD

The technical field relates to the production of polyurethane products. More particularly, it relates to a process for preparing polyurethane products using a lignin-isocyanate mixture.

TECHNICAL BACKGROUND

Polyurethanes (PUs) consist of polymers composed of a chain of organic units joined by carbamate (urethane) links resulting from the reaction between a hydroxyl group and an isocyanate group as follows:

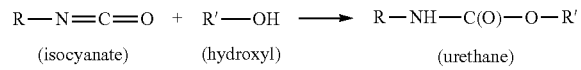

Industrially, polyurethane polymers are usually formed by reacting an isocyanate with a polyol where both the isocyanate and the polyol contain on average two or more functional groups per molecule. The equation below represents an example of a reaction to produce a polyurethane where a Methylene Diphenyl Diisocyanate (MDI) is reacted with ethylene glycol.

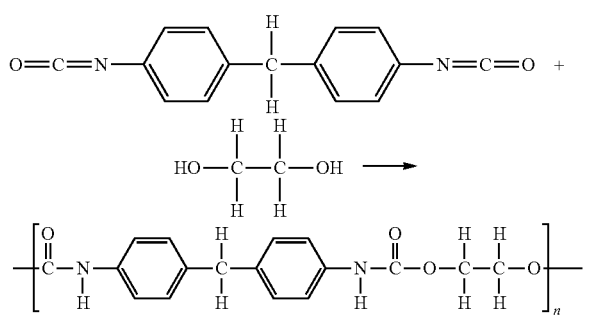

PUs can be produced in many different forms from very low density foams to high performance composites and can thus be used in a multitude of applications. Examples of applications include flexible high-resilience foam seating, rigid foam insulation panels, electrical potting compounds, high performance adhesives, surface coatings, packaging, surface sealants and synthetic fibers to name just a few.

PU foams are usually produced by reacting a resin containing a combination of at least one polyol, surfactant(s), catalyst(s) and blowing agent(s) with an isocyanate containing two or more isocyanate groups.

The polyols used in the production of PUs generally originates from petroleum products. However, due to environmental issues, more and more industrial processes nowadays try to replace petroleum products by "greener" products originated from the biomass. Lignin, which is a polyol biopolymer which can be easily extracted from food-grade and non-food grade biomass, such as agricultural waste or biomass from forests, is seen as a good candidate to replace, at least in part, polyols resulting from petroleum products.

Lignin is the second most abundant biopolymer on earth, after cellulose, and a known by-product of the pulp and paper industry. Physical and chemical properties of lignin depend on wood species, botanic region, and extraction and isolation processes. The use of lignin is attractive because it is less expensive than polyols and may create a smaller environmental footprint.

Lignin has previously been used in the production of PU foams. For example, PU foams have been produced by adding lignin as an organic charge in the polyol-isocyanate mixture. In another process, lignin was dispersed in the polyol containing resin prior to mixing the resin with the isocyanate. Another process for the production of PU foams involved chemically modifying the lignin before mixing with the resin and then with the isocyanate. However, these processes present drawbacks, including for example a high cost production or a cost superior to petroleum derived raw materials, difficulties to regulate the viscosity and/or difficulties to prepare PUs containing relatively high quantities of lignin.

In light of the aforementioned, there is thus a need for a new process for producing polyurethanes which is economic and environmentally friendly.

There is a need for a new process for producing lignin based polyurethane products limiting the above mentioned difficulties observed in known polyurethane production processes.

BRIEF SUMMARY

It is therefore an aim of the present invention to address the above mentioned issues.

In one aspect, there is provided a process for the production of a lignin based polyurethane product comprising mixing at least one dried lignin and at least one isocyanate to form a lignin-isocyanate mixture, and obtaining the lignin based polyurethane product by submitting the lignin-isocyanate mixture to a polymerization reaction.

According to an optional aspect, the polymerization reaction is performed by
heating the lignin-isocyanate mixture, or
adding at least one catalyst to the lignin-isocyanate mixture, or
mixing the lignin-isocyanate mixture with a resin comprising at least one polyol, in the presence of at least one catalyst.

In another optional aspect, the dried lignin has a moisture content of less than about 10 wt %.

In another optional aspect, the dried lignin has a moisture content of less than about 5 wt %.

In another optional aspect, the dried lignin has a moisture content of less than about 2 wt %.

In another optional aspect, the dried lignin has a moisture content of less than about 1 wt %.

In another optional aspect, the dried lignin is present in the lignin-isocyanate mixture in an amount of about 1 wt % to about 50 wt %.

In another optional aspect, the dried lignin is present in the lignin-isocyanate mixture in an amount of about 10 wt % to about 40 wt %.

In another optional aspect, the dried lignin is present in the lignin-isocyanate mixture in an amount of about 20 wt % to about 35 wt %.

In another optional aspect, the lignin is a lignosulfonate, kraft lignin, organosolv lignin, soda lignin, electrochemically separated lignin from black liquor, or any mixture thereof.

In another optional aspect, the lignin is sodium or potassium lignosulfonate.

In another optional aspect, the isocyanate contains at least two isocyanate groups.

In another optional aspect, the isocyanate is an aliphatic isocyanate, an aromatic isocyanate or a mixture thereof.

In another optional aspect, the aliphatic isocyanate is Hexamethylene diisocyanate (HDI), Isophorone diisocyanate (IPDI), or Methylene bis(4-cyclohexylisocyanate) (H12MDI or Hydrogenated MDI), and the aromatic isocyanate is a Methylene diphenyl diisocyanate (MDI), a Toluene diisocyanate (TDI) or Naphtalene diisocyanate (NDI).

In another optional aspect, MDI is 2,2'-MDI, 2,4'-MDI, 4,4'-MDI or any mixture thereof or is polymeric MDI and TDI is 2,4-TDI, 2,6-TDI or a mixture thereof.

In another optional aspect, the isocyanate is Rubinate®, Suprasec®, Lupranate®, Desmodur®, Mondur®, Baymidur®, Wannate™, PAPI™, Voranate™, or Isonate™ isocyanate.

In another optional aspect, the isocyanate is PAPI™ 27 or Wannate™ PM 700.

In another optional aspect, the lignin-isocyanate mixture further comprises at least one additive which is a viscosity reducer, a surfactant, a flame retardant, a blowing agents or any mixture thereof.

In another optional aspect, the catalyst is a metal catalyst, an amine catalyst or any mixture thereof.

In another optional aspect, the catalyst comprises mercury, lead, tin, bismuth, potassium or zinc catalyst or any mixture thereof.

In another optional aspect, the catalyst comprises dibutyltin dilaurate, stannous octoate, potassium octoate or any mixture thereof.

In another optional aspect, the catalyst comprises a tertiary amine.

In another optional aspect, the catalyst comprises triethylenediamine (TEDA), benzyldimethylamine (BDMA), pentamethyl-diethylenetriamine (PMDETA), dimethylcyclohexylamine (DMCHA), dimethylethanolamine (DMEA), triethanolamine (TEA) or any mixture thereof.

In another optional aspect, the polymerization reaction is performed by mixing the lignin-isocyanate mixture with a resin comprising at least one polyol and at least one catalyst.

In another optional aspect, the resin comprises about 0.1-0.6 pphp of an amine catalyst and about 2-6 pphp of a metal catalyst.

In another optional aspect, the polyol is an aliphatic polyester or polyether polyol, an aromatic polyester polyol, a halogenated polyether polyol, a polyethylene glycol, a sucrose based polyether polyol, an amine based polyether polyol, a sucrose/amine based polyether polyol, a toluenediamine based polyol, a Mannich based polyol, a (polytetramethylene glycol) polyol (PTMEG), an acrylic polyol, a phenolic polyol, a lignopolyol, a biopolyol extracted from the biomass, or any mixture thereof.

In another optional aspect, the resin further comprises at least one additive comprising a surfactant, a flame retardant, a blowing agent, water, an antimicrobial agent, a pigment, a fragrance, an UV light stabilizer, or any mixture thereof.

In another optional aspect, the resin further comprises at least one crosslinker or chain extender.

In another optional aspect, the crosslinker or chain extender comprises low molecular weight polyols or polyamines.

In another optional aspect, the crosslinker or chain extender comprise glycerol, diethanolamine (DEA), triethanolamine (TEA), trimethylol propane, ethylene glycol, propylene glycol, dimethylthiotoluenediamine (DMTDA), 1,4-butanediol or diethyltoluene-diamine (DETDA).

In another optional aspect, the polymerization reaction is performed in the presence of mineral or organic charges. In another optional aspect, the mineral or organic charges are added to the resin.

In another optional aspect, the mineral or organic charges comprise wood particles, wood fibers, lignin, cellulose, nanocellulose, cement, clays, glass fibers, calcium carbonate, or any other particulate materials.

In another optional aspect, the polymerization reaction is performed by adding at least one catalyst to the lignin-isocyanate mixture, or by mixing the lignin-isocyanate mixture with a resin comprising at least one polyol in the presence of at least one catalyst, under heating.

In another optional aspect, the polymerization reaction is performed by heating the lignin-isocyanate mixture, or by adding at least one catalyst to the lignin-isocyanate mixture under heating, or by mixing the lignin-isocyanate mixture with a resin comprising at least one polyol in the presence of at least one catalyst under heating, wherein the heating temperature is between about 30° C. and about 90° C.

In another optional aspect, the heating temperature is between about 50° C. and about 70° C.

In another optional aspect of the process, the at least one isocyanate comprises a polymeric MDI, and the polymerization reaction comprises reacting the lignin-isocyanate mixture with a resin containing at least one polyol and at least one catalyst.

In another optional aspect, the process comprises mixing the at least one dried lignin and the at least one isocyanate to form the lignin-isocyanate mixture in the absence of any solvent.

In another aspect, there is provided a process for the production of a lignin based polyurethane product comprising:
    mixing at least one dried lignin and at least one isocyanate to form a lignin-isocyanate mixture, and
    mixing the lignin-isocyanate mixture with a resin comprising at least one polyol in the presence of at least one catalyst, to form the lignin based polyurethane,
    wherein the at least one dried lignin has a water content of less than about 1 wt %, the lignin-isocyanate mixture is solvent-free and the dried lignin is present in the lignin-isocyanate mixture in an amount of about 20 wt % to about 35 wt %.

In another aspect, there is provided a lignin based polyurethane product obtained by the process described herein.

In an optional aspect, the lignin based polyurethane product comprises a rigid foam, a flexible foam, a rigid board, a rigid block, a coating, a packaging, an adhesive, a binder, a sealant, an elastomer, a Thermoplastic Polyurethanes (TPUs) or a Reaction Injection Molding (RIM).

In another aspect, there is provided an article including the above described lignin based polyurethane product.

In a further aspect, there is provided a mixture comprising at least one dried lignin and at least one isocyanate for use in the production of a lignin based polyurethane product.

In an optional aspect, the dried lignin in the mixture has a water content of less than about 10 wt %.

In another optional aspect, the dried lignin has a water content of less than about 5 wt %.

In another optional aspect, the dried lignin has a water content of less than about 2 wt %.

In another optional aspect, the dried lignin has a water content of less than about 1 wt %.

In another optional aspect, the dried lignin is present in the mixture in an amount of about 1 wt % to about 50 wt %.

In another optional aspect, the dried lignin is present in mixture in an amount of about 10 wt % to about 40 wt %.

In another optional aspect, the dried lignin is present in the mixture in an amount of about 20 wt % to about 35 wt %.

In another optional aspect, the lignin present in the mixture is a lignosulfonate, kraft lignin, organosolv lignin, soda lignin, electrochemically separated lignin from black liquor or any mixture thereof.

In another optional aspect, the lignin is sodium or potassium lignosulfonate.

In another optional aspect, the isocyanate present in the mixture contains at least two isocyanate groups.

In another optional aspect, the isocyanate present in the mixture is an aliphatic isocyanate, an aromatic isocyanate or a mixture thereof.

In another optional aspect, the isocyanate present in the mixture is Hexamethylene diisocyanate (HDI), Isophorone diisocyanate (IPDI), or Methylene bis(4-cyclohexylisocyanate) (H12MDI or Hydrogenated MDI), and the aromatic isocyanate is a Methylene diphenyl diisocyanate (MDI), a Toluene diisocyanate (TDI) or Naphtalene diisocyanate (NDI).

In another optional aspect, the isocyanate present in the mixture is 2,2'-MDI, 2,4'-MDI, 4,4'-MDI or any mixture thereof or is polymeric MDI and wherein TDI is 2,4-TDI, 2,6-TDI or a mixture thereof.

In another optional aspect, the isocyanate present in the mixture is Rubinate®, Suprasec®, Lupranate®, Desmodur®, Mondur®, Baymidur®, Wannate™, PAPI™ Voranate™, or Isonate™ isocyanate.

In another optional aspect, the isocyanate present in the mixture is PAPI™ 27 or Wannate™ PM 700.

In another optional aspect, the mixture further comprises at least one additive which is a viscosity reducer, a surfactant, a flame retardant, a blowing agent or any mixture thereof.

In another optional aspect, the mixture further comprises mineral or organic charges.

In another optional aspect, the mineral or organic charges in the mixture comprise wood particles, wood fibers, lignin, cellulose, nanocellulose, cement, clays, glass fibers, calcium carbonate, or any other particulate materials.

Other objects, advantages and features of the present invention will become more apparent upon reading of the following non-restrictive description of embodiments thereof.

DETAILED DESCRIPTION

A process for the production of a lignin based polyurethane product is described below. A mixture comprising at least one lignin and at least one isocyanate for use in the production of a lignin based polyurethane product is also described.

In the present description, the terms "polyurethane" and "polyurethane product" are used interchangeably to refer to a polymeric product comprising urethane functions resulting from the reaction between isocyanate groups and hydroxyl groups. "Polyurethane" may also be referred to as "PU" or "PUR". "Polyurethane" also includes "polyisocyanurate" or "PIR". The "polyurethane" may also include a "PIR/PUR".

The process for preparing the polyurethane products includes a first step of mixing a lignin with an isocyanate to form a lignin-isocyanate mixture (also referred to as "isolignin"). A mixture of different lignins and/or a mixture of different isocyanates can also be used to obtain the lignin-isocyanate mixture. While the lignin-isocyanate mixture may further comprise additives, as detailed below, the process generally does not require the use of an organic solvent to solubilize the lignin before mixing with the isocyanate. Hence, the lignin-isocyanate mixture is generally solvent-free.

The lignin-isocyanate mixture or "isolignin" can be considered as a pre-polymer. A pre-polymer is defined here as the product of a partial chemical reaction between the lignin and the isocyanate. This reaction may be very faint or preliminary at the onset of the mixture, involving only a few most readily available hydroxyl groups of the lignin. Hydrogen bonding between the lignin and the isocyanate may also be formed upon mixing. The initial viscosity of the lignin-isocyanate mixture as a pre-polymer increases with time, more or less rapidly, depending on the temperature, presence of moisture or water, and penetration of the lignin particles by the isocyanate. Depending on the nature of the lignin and the nature of the isocyanate, the pre-polymer lignin-isocyanate mixture may increase in viscosity until it solidifies. Hence, depending on the nature of the lignin and the nature of the isocyanate, the shelf life of the pre-polymer can extend from a few hours to a few days to a few weeks to a few months.

Lignin is a biopolyol which contains reactive hydroxyl groups and one would expect that these groups would immediately react with the isocyanate upon mixing the two products. However, it was observed that under certain conditions, including drying the lignin before mixing with the isocyanate, the mixture can remain stable enough time to be further processed.

The lignin or lignins present in the lignin-isocyanate mixture can be any type of lignin extracted from non-food grade biomass such as biomass from forests or biomass from agricultural waste. For example, the lignin can be extracted from wood or straw. More particularly, the lignin can be extracted by sulfite pulping process, sulfate pulping process also called Kraft process, solvent extraction also referred to as organosolv process, soda process, semi-chemical pulping process, semi-mechanical pulping process, thermomechanical pulping process, steam explosion pulping process, electrochemically separated lignin from black liquor or any other extracting process known in the art. In some embodiments, the lignin used in the process is lignosulfonate (e.g. sodium or potassium lignosulfonate), kraft lignin, organosolv lignin, soda lignin or mixtures thereof. But any other type of lignins resulting from the above mentioned extraction process can also be used.

The lignin, expect for being dried, does not require any other treatment before mixing with the isocyanate(s). Hence, the dried lignin is used as is and contains both high and low molecular weight lignin fractions.

Examples of commercial lignins which can be used in the process include lignins sold in the name Arbo®, Indulin™ (e.g. Indulin™ AT), Protobind™, BioChoice™ Borresperse, Ultrazine or HP-L™ lignin.

The lignin which is mixed with the isocyanate to obtain the lignin-isocyanate mixture is dried lignin. It can be either dried on site before mixing with the isocyanate or can be provided already dried. The moisture content in the dried lignin may vary depending on the intended application of the final polyurethane product. In one embodiment, the lignin or lignins are dried such that the water percentage in weight of the total weight (wt) of the lignin varies from about 0 to about 10 wt %. In another embodiment, the moisture content of the dried lignin varies from about 0 to about 5 wt %. It can preferably vary from about 0 to about 2 wt %. Most preferably, the moisture content of the dried lignin is less than about 1.0 wt %. In the present description, the expressions "moisture content" and "water content" are used interchangeably to refer to the percentage of water in the dried lignin, which is expressed in weight of the total weight (wt) of the lignin.

The term "about" as used in the present description means within an acceptable error range for the particular value as determined by one of ordinary skill in the art, and will depend in part on how the value is measured or determined, i.e. the limitations of the measurement system. It is commonly accepted that a 10% precision measure is acceptable and encompasses the term "about".

The drying of the lignin can be performed using any known method in the art, including for example using a flash dryer, a spray dryer, a forced air convection oven, filtration, a mechanical press, etc. . . . . . In some embodiments, the lignin is received as a pre-dried lignin, for example with a moisture content in weight of the total weight (wt) of the lignin of about 10 wt %, and is further dried before mixing with the isocyanate using a flash dryer so as to reach a moisture content of about 1.0 wt % or less.

The quantity of dried lignin used in the lignin-isocyanate mixture will vary depending on intended application for the final polyurethane product. In one embodiment, the dried lignin is added in about 1 to about 50 wt % based on the total weight of the mixture lignin-isocyanate (additives included as the case may be). However, it could be possible to add more than 50 wt % of lignin for certain applications. In another embodiment, the percentage of lignin is from about 10 to about 40 wt % based on the total weight of mixture lignin-isocyanate. In a further embodiment, lignin is used in about 10 to about 35 wt % based on the total weight of mixture lignin-isocyanate. The lignin may be used in amounts from about 20 to about 35 wt % based on the total weight of mixture lignin-isocyanate The isocyanates mixed with the lignin to obtain the lignin-isocyanate mixture can be any isocyanate used in known processes for synthetizing polyurethanes. The nature of the isocyanate will depend on the application which is intended for the polyurethane product and a person skilled in the art will choose the isocyanate accordingly. The isocyanate(s) is(are) in liquid form.

In one embodiment the isocyanate contains at least two isocyanate groups. It can be an aliphatic isocyanate or an aromatic isocyanate. Examples of aliphatic isocyanates are aliphatic diisocyanates such as Hexamethylene diisocyanate (HDI), Isophorone diisocyanate (IPDI), Methylene bis(4-cyclohexylisocyanate) (H12MDI or Hydrogenated MDI). Aromatic diisocyanates are examples of isocyanates that can be used for mixing with the lignin. In one embodiment, the aromatic group is a phenyl or a tolyl. Examples thus include Methylene diphenyl diisocyanates (MDI), Toluene diisocyanates (TDI) or Naphtalene diisocyanate (NDI). MDI can be any one or a mixture of the three different isomers 2,2'-MDI, 2,4'-MDI, and 4,4'-MDI or can be polymeric MDI. TDI can be either 2,4-TDI or 2,6-TDI or a mixture of both.

MDI may be used to make rigid, semi-rigid and flexible foams, cast elastomers, thermoplastic elastomers, microcellular elastomers, coatings or binders. Polymeric MDI may be used to produce rigid polyurethane foams. TDI may be used in the production of flexible foams (e.g. for mattresses, automobile seats, upholstery cushions, packaging materials). Other types of non-foam polyurethanes based on TDI are useful in coatings, adhesives, paints, binders, and sealants. NDI are used in the making of elastomer polyurethanes and aliphatic diisocyanates HDI and IPDI may be used to make polyurethanes useful as paints, coatings, leather finishing, lacquers, foams, or in special applications, such as enamel coatings which are resistant to abrasion and degradation from ultraviolet light (e.g. as coatings for aircraft).

In certain embodiments, the lignin-isocyanate mixture comprises commercial isocyanates including for example Rubinate®, Suprasec® (e.g. Suprasec® 9561), Lupranate®, Desmodur®, Mondur® (e.g. Mondur® 489), Baymidur®, Wannate™ (e.g. Wannate™ PM 700), PAPI™ (e.g. PAPI™ 27), Voranate™ or Isonate™ isocyanates.

In one embodiment, additives may be present in the lignin-isocyanate mixture. These additives should not react with the lignin and the isocyanate. Examples of additives useful for the intended product processing or applications or properties include viscosity reducers, surfactants, flame retardants, and blowing agents. In some cases low viscosity flame retardant or blowing agent are also used as the viscosity reducer. Example of flame retardant includes TCPP (Tri(beta-chloropropyl)phosphate). Example of blowing (foaming) agent includes hydrocarbons, halogenated hydrocarbon, HFO, hydrochlorofluorocarbon HCFC, hydrochlorocarbon HCC, hydrofluorocarbon HFC, pentafluoropropane or pentafluorobutane/heptafluoropropane.

The quantity of additives in the lignin-isocyanate mixture can be adapted depending on the polyurethane product intended application.

In one embodiment, the lignin-isocyanate mixture may comprise about 100 parts (in weight) of polymeric MDI, about 50 parts of lignin, up to about 12 parts of a flame retardant, up to about 10 parts of a blowing agent and up to about one part of surfactant (for a total of 173 parts). In another embodiment, the lignin-isocyanate mixture may comprise about 100 parts (in weight) of MDI, about 50 parts of lignin, about 12 parts of a flame retardant, about 6 parts of a blowing agent and about one part of surfactant. Such compositions would allow producing polyisocyanurate rigid (PIR) foams.

The lignin-isocyanate mixture (isolignin) can be obtained by adding the dried lignin to the isocyanate under stirring. The mixing can be done for example using a high shear mixer. When additives are used, they can be added to the isocyanate before mixing with the lignin or directly to the lignin-isocyanate mixture.

In one embodiment, the isocyanate-lignin mixing is performed under conditions where contact with moisture is limited. For example, the mixing is made in closed vessels and the time that tanks or reservoirs containing the lignin and isocyanate are open to atmosphere is limited.

Once the lignin-isocyanate mixture is obtained, it can either be directly used in the next step of the polyurethane production or stored for being used at a later time. In the latter case, the mixture is kept away from moisture in a hermetic container and preferably kept under stirring for avoiding lignin deposition. In a preferred embodiment, the lignin-isocyanate mixture is used in the next step of the process as soon as it has been prepared.

In one embodiment, the lignin-isocyanate mixture, optionally comprising additives as mentioned above, has a viscosity comprised between about 500 to 50,000 centipoises (cP), or between 500 to 5,000 cP, or even between 500 and 2,000 cP. In another embodiment, the required viscosity is obtained by addition of viscosity reducers in the mixture, such as low viscosity flame retardants and/or blowing agents.

In the next step of the process, the lignin-isocyanate mixture is allowed to react to form urethane bonds between the hydroxyl groups of the lignin and the isocyanate groups to obtain the polyurethane product. This step, which may be called polymerization step, can be performed under different conditions. The polymerization can be carried out by heating the mixture, or in the presence of at least one catalyst, or in the presence of a resin containing at least one polyol and at least one catalyst. A part or all the hydroxyl groups of the lignin are allowed to react. In one embodiment, all the hydroxyl groups of the lignin are allowed to react. When the polymerization involves the use of a polyol containing resin, a polyol-isocyanate-lignin reaction also occurs. In other words, both the hydroxyl groups of the polyol and the hydroxyl groups of the lignin are allowed to react with the isocyanate groups. A polyurethane polymeric network including the lignin is thus allowed to form.

As mentioned above, the polymerization step can be performed under several different conditions. The polymerization can be initiated i) by heating the isolignin, ii) in the presence of at least one catalyst, or iii) in the presence of a resin containing at least one polyol and a catalyst.

When polymerization is initiated by heating the lignin-isocyanate mixture, the reaction can be performed at a temperature comprised between about 30° C. and about 90° C., or between about 50° C. and about 70° C.

The polymerization can also be initiated in the presence of at least one catalyst. In this case the catalyst is added to the lignin-isocyanate mixture.

In another embodiment, polymerization is initiated using at least one catalyst and a resin containing at least one polyol. Preferably, the polymerization is initiated using a resin which contains both the polyol(s) and the catalyst.

The resin which is reacted with the lignin-isocyanate mixture to form the polyurethane product contains at least one polyol. In an embodiment, the resin contains a mixture of polyols. When the resin is mixed with the lignin-isocyanate mixture, both the hydroxyl groups of the polyol and the hydroxyl groups of the lignin are allowed to react with the isocyanate groups. The polyurethane which is obtained thus include urethane groups resulting both from reaction with the lignin and with the polyol(s).

The polyol(s) contained in the resin may be any polyol(s) commonly used in the production of polyurethanes, and are divided into two classes: polyester polyols and polyether polyols. For example, they can be aliphatic or aromatic polyester or polyether polyols, halogenated polyether polyols, polyethylene glycols, sucrose based polyether polyols, amine based polyether polyols, sucrose/amine based polyether polyols, toluenediamine based polyols, Mannich based polyols, (polytetramethylene glycol) polyols (PTMEG), acrylic polyols, phenolic polyols, lignopolyols, biopolyols extracted from the biomass, such as from soya, castor oil, oil or biosuccinic acid, and from wood residues. Examples of biopolyols extracted from wood residues include lignin, cellulose and nanocellulose.

In certain embodiments, the process may use commercial polyols including for example Stepanpol® (e.g. Stepanpol® PS2352), Jeffol®, Daltolac®, Voranol™, Specflex™, Voralux™, Diorez™, Acclaim®, Arcol®, Multranol®, Softcel®, Ultracel®, Hyperlite®, Pluracol®, Quadrol®, Lupranol®, Lupraphen®, Ixol® (e.g. IXOL B-251), Terate® (e.g. Terate® 3512), Terol®, Isoexter, Isoter, Diexter®, or Carpol®, or SPA-530, TEAP-265 or EDAP-800 all three from Carpenter Co.

The resin may also include, in addition to the polyol(s), certain additives well known by one skilled in the art, for imparting required properties to the final polyurethane product. These additives include, without to be limited to, surfactants, flame retardants, blowing agents, water, antimicrobial agents, pigments, fragrances and/or UV light stabilizers. Other additives such as crosslinkers or chain extenders may also be added to the resin for improving PUs properties by forming hard segments into the polymer network. Examples of crosslinkers and chain extenders include low molecular weight polyols or polyamines such as glycerol, diethanolamine (DEA), triethanolamine (TEA), trimethylol propane, ethylene glycol, propylene glycol, dimethylthiotoluenediamine (DMTDA), 1,4-butanediol, diethyltoluene-diamine (DETDA) The additives are usually present in less than about 20 wt % of formulated polyols, but can be present in more than about 50% in some applications.

The catalyst(s) which may be used alone, in combination with the polyol, or which is present in the polyol containing resin may be chosen in the two main classes of catalyst used in PU production which include metal catalysts and amine catalysts.

The metal catalysts are commonly used to accelerate the reaction and formation of urethane linkages and hence promote rapid curing. Some of them also promote the isocyanurate reaction. They are based, without being limited to, on mercury, lead, tin, bismuth, potassium and zinc. Examples of metal catalysts include dibutyltin dilaurate, stannous octoate and potassium octoate.

The amine catalysts are mainly used to promote cross-linking and are often tertiary amines. Amine catalysts can be, without being limited to, alkyl amines such as triethylenediamine (TEDA) also called 1,4-diazabicyclo[2.2.2]octane (DABCO), benzyldimethylamine (BDMA), pentamethyldiethylenetriamine (PMDETA), or dimethylcyclohexylamine (DMCHA), or ethanol amines such as dimethylethanolamine (DMEA) or triethanolamine (TEA).

In one embodiment, a metal catalyst or an amine catalyst is either used for promoting the formation of the PU from the lignin-isocyanate mixture.

The quantity of catalyst may be of from about 0.5 pphp to 10 pphp, where pphp stands for part per hundred parts of total polyol.

In another embodiment, a combination of an amine catalyst with a metal-based catalyst is used for promoting the polymerization. The quantity of catalysts is usually very small in comparison with the other additives. For example, catalysts are used at less than about 5% by weight of the resin formulation. In one embodiment, the resin formulation may include 0.1-0.6 pphp of amine catalyst and 2-6 pphp of metal catalyst. Such a combination could be used for example to produce polyisocyanurate rigid (PIR) foams.

In certain embodiments, the process may use commercial catalysts including for example catalysts sold under the names Dabco®, Polycat®, Jeffcat®, Toyocat®, Tegoamin®, Kosmos®, Curithane® or Lupragen®.

The ratio of resin to lignin-isocyanate mixture used in the process depends on the application intended for the final polyurethane product. A person skilled in the art would be able to calculate the quantities of lignin-isocyanate mixture and resin to be used for the required application. For example, the lignin-isocyanate mixture may be reacted with the resin in a weight ratio of resin to lignin-isocyanate mixture of from about 0.3:1 to about 0.8:1 to form polyisocyanurate rigid (PIR) foams. In another example, the weight ratio of resin to lignin-isocyanate mixture would be from about 2:1 to about 4:1 to form semi-flexible polyurethane foams. In order to make spray polyurethane foam (SPF), one may use a weight ratio of resin to lignin-isocyanate mixture of from about 0.85 to 1.15.

During the polymerization step, it may also be possible to add organic or mineral charges to the reaction mixture. In an embodiment, the isolignin is added to the organic or mineral charges and then polymerization is initiated through heating. In another embodiment, the isolignin is added to these organic or mineral charges and then polymerization is initiated with the use of a catalyst, and optionally, with heating. When a polyol containing resin is used for initiating the polymerization, these additives can be present in the polyol containing resin itself. However, they may also be added separately. In a further embodiment, the isolignin and the polyol containing resin, preferably also containing a catalyst, are mixed together and the mixture is immediately added to the organic or mineral charges.

For example, organic charges such as wood in various forms (e.g. wood particles or wood fibers), lignin, cellulose, nanocellulose or inorganic particles such as cement, clays, glass fibers, calcium carbonate or other particulate materials, may be used depending on the intended application.

When the polymerization takes place in the presence of wood particles or wood fibers as additives, one may obtain polyurethane particle board or fiberboards. In this case, the polyurethane can be said to be used as a sealant or adhesive.

Organic or inorganic additives may be used in about 1% to about 50% in weight of the total weight of the lignin-isocyanate mixture and optionally resin. However, if the lignin based polyurethane is used as a sealant or adhesive, the proportions of additives may be higher.

When the polymerization takes place with a catalyst or with heat only, i.e. when the product is made from the isocyanate and lignin only without using a polyol resin, one may obtain rigid boards that can be used in different applications (construction, furniture, molding, etc).

In an embodiment, the lignin based polyurethane is obtained by reacting the lignin-isocyanate mixture with a polyol containing resin. The reaction of the lignin-isocyanate mixture with the polyol containing resin can be performed in different ways depending on the intended application for the final polyurethane product. The reaction can be done at or near to room temperature. However, it could also be possible to do the reaction at a temperature comprised between about 30° C. and about 90° C., or between about 50° C. and about 70° C.

In varying the nature of the lignin(s), the isocyanate(s), the polyol(s) and/or the additives, the process allows preparing a large variety of different polyurethane products. These polyurethane products include, without being limited to, rigid foams, flexible foams, rigid boards, rigid blocks, coatings, packaging, adhesives, binders, sealants (one- or two-component sealants), elastomers, Thermoplastic Polyurethanes (TPUs) or Reaction Injection Molding (RIM).

For example, polyisocyanurate rigid (PIR) foam panels can be produced using the present process. The PIR foam panel is manufactured by blending the lignin-isocyanate mixture with the polyol containing resin, and immediately dispersing the resulting mixture on the surface of a first protection sheet, e.g. aluminum sheets, kraft sheets or fiberglass sheets. The polymerization reaction starts as soon as the reaction mixture is applied to the first sheet and the PU foam forms. During the polymerization reaction, the PU which is formed is glued on the surface of the first sheet. A second protection sheet is provided over the foam and is allowed to glue thereon. The PIR foam is thus formed between the two sheets. The resulting laminated PIR foam panels can be used for example as insulating boards in the construction industry. In an embodiment, the manufacturing of such PIR foam panels can be carried continuously using a conveyor belt.

In another application, also for insulating in the construction industry, the PU foam can be produced on-site by spraying a blend of the lignin-isocyanate mixture with the polyol containing resin onto the surface to be insulated. More particularly, the lignin-isocyanate mixture and the resin, which are provided in separate containers, are each sent from the container to a spray gun through a tube where they are allowed to be mixed when the manipulator operate the gun. The polymerization reaction is allowed to start as soon as the reaction mixture exits the nozzle of the spray gun and the foam forms on the surface.

Other types of lignin based PU panels where the PU is formed between two rigid protection boards, such as plywood boards, can be produced using the present process. In this case, a first plywood board is positioned in a mold and a second plywood board is positioned in the mold at a predetermined distance above the first sheet. Then, the lignin-isocyanate mixture and the polyol containing resin are blended and the resulting mixture is immediately injected in the mold in the space between the two plywood boards. The polymerization reaction is allowed to start as soon as the reaction mixture is injected into the mold and the PU foam forms between the two plywood boards. The resulting panels are structural insulating panels which can be used for building walls or roofs in the construction industry.

As previously mentioned, the process allows producing a large variety of different polyurethane products, not limited to the above mentioned products. A person skilled in the art will be able to select which lignin(s), isocyanate(s), polyol(s) and/or additives to be used, and their quantities, depending on the application which is required for the final PU product.

The present process allows obtaining lignin based polyurethane products containing relatively large amounts of lignin. This allows reducing production costs since lignin is less expensive than polyols which can be used in smaller quantities than in conventional process or even be avoided. This also results in a smaller environmental footprint.

The process preferably does not require the use of any organic solvent as would other known processes. This is also beneficial for environmental and economic aspects.

In addition, the process does not require installing expensive new equipment. The same equipment as those known to produce polyurethane products, or with minor modifications, can be used. The process can thus be readily implemented, limiting investment required to use this technology.

Moreover, the process can be fine-tuned to fit almost any application.

The following examples are provided to illustrate some properties and advantages of the process.

EXAMPLES

The following materials are used in the examples.

Wannate™ PM 700: A polymeric MDI of NCO content around 29-32%, average functionality of around 3.0-3.1 and viscosity of 650-750 cP at 25° C., available from Yantai Wanhua America Co., LTD.

Dow PAPI 27: A polymeric MDI of NCO content around 31%, average functionality of 2.7 and viscosity of 150-220 cP at 25° C., available from Dow Chemical Company.

Suprasec® 9561: a uretonomine-modified pure monomeric MDI of NCO content around 29%, average functionality of around 2.1 and viscosity of 36 cPs at 25° C., available from Huntsman.

Mondur® 489: A polymeric MDI of NCO content around 30-31%, average functionality of around 3.0 and viscosity of 610-790 cPs at 25° C., available from Bayer Material Science.

Sodium or potassium lignosulfonate: Lignin extracted by a sulfite process and available from Tembec (sold under the trademark Arbo®).

Protobind™: lignin extracted by soda process and available from Green Value

Indulin™ AT: lignin extracted by kraft process and available from MeadWestvaco

Organosolv Lignin: lignin extracted by solvent process and available from Lignol Innovations Ltd.

TCPP: Tri(beta-chloropropyl)phosphate, a flame retardant, available from Aceto Corporation.

HFC-365mfc/227ea: Pentafluorobutane/Heptafluoropropane, a foaming agent available from Solvay Fluorides LLC, Honeywell or Sinochem.

HFC-254fa: Pentafluoropropane, a foaming agent available from Solvay Fluorides LLC, Honeywell or Sinochem.

Terate® 3512: An aromatic polyester polyol of hydroxyl value 227 mg KOH/g and viscosity of 3,000 cPs @ 25° C., available from Invista Stepanpol® PS2352: An aromatic polyester polyol of hydroxyl value 240 mg KOH/g, average functionality of around 2 and viscosity of 3,000 cP at 25° C., available from Stepan.

IXOL B-251: A brominated aliphatic polyether polyol of hydroxyl value 330 mg KOH/g, average functionality of around 3 and viscosity of 7,000 cP at 25° C., available from Solvay Fluorides LLC.

SPA-530: A sucrose/amine initiated polyether polyol of hydroxyl value 530 mg KOH/g, average functionality of around 5.5 and viscosity of 11,000 cP at 25° C., available from Carpenter Co.

TEAP-265: An triethanol amine initiated polyether polyol of hydroxyl value 635 mg KOH/g, average functionality of around 3 and viscosity of 465 cP at 25° C., available from Carpenter Co.

EDAP-800: An ethylene diamine initiated polyether polyol of hydroxyl value 800 mg KOH/g, average functionality of around 4 and viscosity of 16,000 cP at 25° C., available from Carpenter Co.

Glycerine: 1,2,3-propanetriol or glycerol, an aliphatic alcohol used as a crosslinker and available from Brenntag Canada Inc.

Dabco® LK443: A non silicone surfactant available from Air Products.

Silstab® 2100: A silicone surfactant available from Siltech Co.

Polycat® 5: Pentamethyldiethylenetriamine, an amine-based catalyst available from Air Products.

Polycat® 8: Dimethylcyclohexylamine, an amine-based catalyst available from Air Products.

Polycat® 9: Bis(3-dimethylaminopropyl)-n,n-dimethyl-propanediamine, an amine-based catalyst available from Air Products.

Dabco® K15: Potassium octoate in diethylene glycol, a metal catalyst available from Air Products.

Polycat® 46: Potassium acetate in ethylene glycol, a metal catalyst available from Air Products.

Curithane® 52: 2-methyl(n-methyl amino b-sodium acetate nonyl phenol) in 2,2'-oxybisethanol diethylene glycol, an amine-based trimerization catalyst, available from Air Products.

Dabco® BDMA: benzyldimethylamine, an amine-based catalyst available from Air Products.

Dabco® T-12: dibutyltin dilaurate, a metal catalyst available from Air Products.

Dabco® TMR: a tertiary amine-based trimerization catalyst, available from Air Products.

I BLU 332: A color paste available from Marbo Italia Spa.

The properties of the foam prepared according to the following examples were determined using the following methods:

Foam core density: ASTM D1622
Compressive strength: ASTM D1621
Initial k-factor ASTM C518
Dimensional stability: ASTM D2126.

Example 1

Rigid polyisocyanurate foam laminate boards (PIR) were manufactured by a continuous lamination process, using the formulations shown in Table 1. "A side" comprises the lignin-isocyanate mixture and "B side" comprises the polyol containing resin. One sample was prepared using dried lignin and another sample was prepared using undried lignin for comparison. The dried lignin was obtained using a flash dryer with air temperature at about 230° C. The water content of the dried lignin was approximately 0.5% by weight. The water content of the undried lignin was approximately 5.5% by weight.

Laminate board samples were made on a Kornelac™ laminator. The laminator is 7.0 meters long and can produce boards up to 1.25 meters wide and 11.4 centimeters thick. The conveyor can be heated to 82° C., and the laydown table to 54° C. The laminator conditions are shown in the Table 1.

PIR panels were made to a thickness of 7.6 cm and 122 cm wide, as described in Table 1.

TABLE 1

Preparation of PIR panels and properties
Samples, wt % of total foam

|  | Dry Lignin ≅ 0.5% MC* | Undried Lignin ≅ 5.5% MC* |
|---|---|---|
| A side | | |
| Wannate ™ PM 700 | 42.85 | |
| Papi 27 | | 43.7 |
| Sodium Lignosulfonate | 21.43 | 21.8 |
| TCPP | 4.29 | 1.0 |
| HFC-365mfc/227ea 93-07% | 4.29 | |
| HFC-365mfc/227ea 87-13% | | 0 |
| B side | | |
| Stepanpol ® PS 2352 | 17.55 | 25.6 |
| Dabco ® LK443 | 0.35 | 0.5 |

TABLE 1-continued

Preparation of PIR panels and properties
Samples, wt % of total foam

|  | Dry Lignin ≅ 0.5% MC* | Undried Lignin ≅ 5.5% MC* |
| --- | --- | --- |
| TCPP | 1.76 | 0 |
| Dabco ® K15 | 1.14 | 0.6 |
| Polycat ® 46 | 0.09 | 0.3 |
| Curithane ® 52 | 0.01 | 0 |
| Polycat ® 9 | 0 | 0.1 |
| Water | 0.28 | 0.1 |
| HFC-365mfc/227ea 93-07% | 5.97 | 6.4 |
| Index** | 285 | 263 |
| Reactivity | | |
| Cream Time (sec) | 3 | 3 |
| String Gel Time (sec) | 30 | 20 |
| Final Rising Time (sec) | 45 | 51 |
| Laminator Conditions | | |
| Laminator Top (° C.) | 49 | 52 |
| Laminator Bottom (° C.) | 49 | 54 |
| A-side Tank Temperature (° C.) | 20 | 23 |
| B-side Tank Temperature (° C.) | 23 | 23 |
| A-side output (kg/min) | 17.5 | 8.9 |
| B-side output (kg/min) | 6.5 | 4.4 |
| Foam Properties | | |
| Foam core density (kg/m$^3$) | 37.3 | 41.8 |
| Compressive strength (KPa) | 131 | 90 |
| Initial k-factor (W/(mK)) | 0.0217 | N/A |
| Initial k-factor (BTU · in/ft$^2$ · hr · ° F.) | 0.151 | N/A |
| Dimensional stability at −20° C. (% linear change) | 0 | N/A |

*MC = moisture content
**Index = (NCO groups/OH groups) × 100. An index of 285 means that there are 2.85 times more NCO groups than OH groups. Index is calculated only considering the OH groups from the polyol.

The results provided in Table 1 show that the undried lignin is very difficult to process with a very fast initial reaction and post expansion at the exit of the laminator; the mechanical properties (e.g. compressive strength) are very weak.

Example 2

Structural insulated panels (SIPs) were manufactured by a discontinuous process and using the formulation shown in Table 2. "A side" comprises the lignin-isocyanate mixture and "B side" comprises the polyol containing resin. The water content of the dried lignin used in the lignin-isocyanate mixture was approximately 0.5% by weight. A 122 cm width×244 cm length plywood board was positioned in a mold and a second plywood board with the same dimensions was placed on top of it, at a predetermined distance above the first sheet. The lignin-isocyanate blend and the resin were mixed together and immediately injected inside the mold, between the two plywood boards. During the process of the SIPs foam forming, a continuous pressure sufficient to maintain the mold closed was applied to obtain the desired panel thickness. The dimensions of the obtained foam between the two plywood boards were 9.2 cm thickness×114 cm width×236 cm length.

TABLE 2

Preparation of SIP panels and properties
Samples, wt % of total foam

| A side | |
| --- | --- |
| Wannate ™ PM 700 | 38.01 |
| Sodium Lignosulfonate | 19.00 |
| TCPP | 4.56 |
| HFC-365mfc/227ea 87-13% | 2.28 |
| B side | |
| SPA-530 | 14.98 |
| IXOL B-251 | 8.84 |
| TCPP | 1.50 |
| Silstab ® 2100 | 0.50 |
| Polycat ® 8 | 0.38 |
| Glycerine | 1.20 |
| Water | 0.50 |
| HFC-365mfc/227ea 87-13% | 8.24 |
| Index | 101 |
| Reactivity | |
| Cream Time (sec) | 27 |
| String Gel Time (sec) | 210 |
| Final Rising Time (sec) | 280 |
| Pump Output | |
| A-side output (kg/min) | 18 |
| B-side output (kg/min) | 10 |
| Foam Properties | |
| Foam core density (kg/m$^3$) | 38.4 |

Example 3

Spray polyurethane foam (SPF) was prepared using the formulation shown in Table 3. Mixtures of resin and iso-lignin (lignin water content of approximately 1%) were prepared and introduced using transfer pumps to two separate tanks (tank A: mixture of iso-lignin; tank B: resin) connected to a high pressure proportioner spray machine model H-2000 from GUSMER Corporation, pre-set to a ratio of 1:1 by volume (could also be set to a ratio of 2:1). The work pressure can be adjusted as needed (between 6.2 and 8.3 MPa up to 13.8 MPa) and the temperature of the mixture can vary between 50 and 60° C. The foam was then sprayed with a gun on a rigid and dry substrate.

TABLE 3

Preparation of SPF and properties
Samples, % of total foam

| A side | |
| --- | --- |
| PAPI 27 | 39.97 |
| Sodium Lignosulfonate | 9.99 |
| B side | |
| Stepanpol ® PS 2352 | 16.45 |
| IXOL B-251 | 7.71 |
| SPA-530 | 3.93 |
| TEAP-265 | 1.34 |
| EDAP-800 | 2.69 |
| TCPP | 4.82 |
| Silstab ® 2100 | 0.64 |
| Polycat ® 5 | 0.96 |
| Polycat ® 9 | 0.77 |
| Dabco ® BDMA | 0.77 |
| T-12 | 0.77 |
| Water | 0.46 |
| HFC-365mfc/227ea 87-13% | 7.71 |
| HFC-245fa | 0.96 |
| I BLU 332 | 0.04 |
| Index | 128 |

TABLE 3-continued

Preparation of SPF and properties
Samples, % of total foam

| Reactivity | |
|---|---|
| String Gel Time (sec) | 7.5 |
| Conditions | |
| A-side Pressure (MPa) | 6.9 |
| B-side Pressure (MPa) | 6.2 |
| A-side Tank Temperature (° C.) | 54 |
| B-side Tank Temperature (° C.) | 54 |
| Foam Properties | |
| Foam core density (kg/m$^3$) | 38.4 |

Example 4

Foam without polyol was prepared using the formulation shown in Table 4.

The foam product is prepared in the laboratory in the following way with all chemicals at room temperature. Isolignin (lignin approximately 0.5% by weight moisture content) is first prepared. The blend of catalysts, surfactant, blowing agent and fire retardant TCPP used as a carrier, is then added to the isocyanate and mixed vigorously. The reacting mixture is poured in an open mold and allowed to foam.

TABLE 4

Preparation of PU foam without polyol and properties
Samples, wt % of total foam

| A side | |
|---|---|
| Wannate ™ PM 700 | 47.48 |
| Sodium Lignosulfonate | 23.74 |
| B side | |
| Dabco ® LK 443 | 0.41 |
| TCPP | 10.37 |
| Dabco ® K15 | 2.32 |
| Dabco ® TMR | 3.34 |
| HFC-365mfc/227ea 87-13% | 12.33 |
| Ratio B/A | 0.4 |
| Reactivity | |
| String Gel Time (sec) | 18 |
| Foam Properties | |
| Foam core density (kg/m$^3$) | 44.4 |

Example 5

A mixture of isocyanate and dry lignosulfonate (water content of approximately 0.5%) in a ratio of 2:1 by weight was prepared and added to wood particles with a proportion of 1:2. The resulting mixture was placed and molded inside a manual press and kept in the oven overnight at 70° C. After cooling at room temperature, the manual press was withdrawn to give a new iso-lignin wood particles panel.

Example 6

Foam was prepared in the laboratory with monomeric MDI using the formulation shown in Table 5.

The foam product is prepared in the laboratory in the following way with all chemicals at room temperature. Isolignin (lignin approximately 0.5% by weight moisture content) is first prepared. The B-side is then added to the isocyanate and mixed vigorously. The reacting mixture is quickly poured in an open mold and allowed to foam.

TABLE 5

Preparation of PU foam with monomeric MDI and properties
Samples, wt % of total foam

| A side | |
|---|---|
| MDI Suprasec ® 9561/Mondur ® 489 (50/50) | 42.1 |
| Sodium Lignosulfonate | 21 |
| B side | |
| Stepanpol ® PS 2352 | 25.3 |
| Dabco ® LK443 | 0.5 |
| TCPP | 0.6 |
| Dabco ® K15 | 1.5 |
| Polycat ® 46 | 0.2 |
| Polycat ® 5 | 0.1 |
| Water | 0.3 |
| HFC-365mfc/227ea 87-13% | 8.3 |
| Index | 204 |
| Reactivity | |
| String Gel Time (sec) | 18 |
| Foam Properties | |
| Foam core density (kg/m$^3$) | 29 |
| Compressive strength (KPa) | 56 |
| Initial k-factor (W/(mK)) | 0.0173 |
| Initial k-factor (BTU · in/ft$^2$ · hr · ° F.) | 0.12 |
| Dimensional stability at −20° C. (% linear change) | 0.0 |

Example 7

Foam was prepared in the laboratory with different types of lignin using the formulations shown in Table 6.

The foam product is prepared in the laboratory in the following way with all chemicals at room temperature. Isolignin (lignin approximately 0.5% by weight moisture content) is first prepared. The B-side is then added to the isocyanate and mixed vigorously. The reacting mixture is quickly poured in an open mold and allowed to foam.

TABLE 6

Preparation of foams with different types of lignin and properties
Samples, wt % of total foam

| A side | | | | | |
|---|---|---|---|---|---|
| MDI Mondur ® 489 | 42.1 | 42.1 | 42.9 | 47.5 | 42.4 |
| Type of Lignin | Sodium Lignosulfonate | Potassium Lignosulfonate | Protobind ™ Soda | Indulin ™ AT Kraft | Lignol Organosolv |
| % Lignin | 21.1 | 21.1 | 21.4 | 19.4 | 21.1 |

TABLE 6-continued

Preparation of foams with different types of lignin and properties
Samples, wt % of total foam

| B side | | | | | |
|---|---|---|---|---|---|
| Stepanpol ® PS 2352 | 25.1 | 25.1 | 24.4 | 23.1 | — |
| Terate ® 3512 | — | — | — | — | 25.6 |
| Dabco ® LK443 | 0.5 | 0.5 | 0.5 | 0.5 | 0.5 |
| TCPP | 0.6 | 0.6 | 0.5 | 0.5 | 0.6 |
| Dabco ® K15 | 1.5 | 1.5 | 1.0 | 0.8 | 1.5 |
| Polycat ® 46 | 0.2 | 0.2 | 0.2 | 0.2 | 0.2 |
| Polycat ® 5 | 0.1 | 0.1 | 0.1 | 0.1 | 0.2 |
| Water | 0.3 | 0.3 | 0.2 | 0.3 | 0.4 |
| HFC-365mfc/227ea, 87/13% | 8.3 | 8.3 | 8.8 | 7.6 | 7.7 |
| Index | 206 | 206 | 240 | 256 | 224 |
| Reactivity | | | | | |
| String Gel Time (sec) | 24 | 17 | 29 | 19 | 17 |
| Foam properties | | | | | |
| Foam core density (kg/cm3) | 28 | 32 | 41 | 35 | 33 |
| Compressive strength (KPa) | 52 | 37 | 111 | 106 | 107 |
| Initial k-factor (W/(m K)) | 0.0189 | 0.0209 | 0.0197 | 0.0343 | 0.0169 |
| Initial k-factor (BTU · in/ft$^2$ · hr · ° F.) | 7.6 | 6.9 | 7.3 | 4.2 | 8.5 |

The above-described embodiments and examples are considered in all respect only as illustrative and not restrictive, and the present application is intended to cover any adaptations or variations thereof, as apparent to a person skilled in the art. Of course, numerous other modifications could be made to the above-described embodiments without departing from the scope of the invention, as apparent to a person skilled in the art.

The scope of the invention is therefore intended to be limited solely by the scope of the appended claims.

The invention claimed is:

1. A process for the production of a lignin based polyurethane product comprising:
    drying at least one lignin to obtain a dried lignin with a moisture content of less than 1 wt %,
    preparing a lignin-isocyanate mixture by mixing the obtained dried lignin and at least one isocyanate compound comprising at least two isocyanate groups, and
    obtaining the lignin based polyurethane product by submitting the lignin-isocyanate mixture to a polymerization reaction,
    wherein mixing the at least one dried lignin and the at least one isocyanate compound is performed in the absence of any solvent.

2. The process of claim 1, wherein the polymerization reaction is performed by heating the lignin-isocyanate mixture,
    adding at least one catalyst to the lignin-isocyanate mixture, or
    mixing the lignin-isocyanate mixture with a resin comprising at least one polyol, in the presence of at least one catalyst.

3. The process of claim 1, wherein the obtained dried lignin is present in the lignin-isocyanate mixture in an amount of about 1 wt % to about 50 wt.

4. The process of claim 1, wherein the obtained dried lignin is present in the lignin-isocyanate mixture in an amount of about 10 wt % to about 40 wt %.

5. The process of claim 1, wherein the obtained dried lignin is present in the lignin-isocyanate mixture in an amount of about 20 wt % to about 35 wt %.

6. The process of claim 1, wherein the at least one lignin is a lignosulfonate, a kraft lignin, an organosolv lignin, a soda lignin, an electrochemically separated lignin from black liquor or a mixture thereof.

7. The process of claim 1, wherein the isocyanate compound is Hexamethylene diisocyanate (HIM), Isophorone diisocyanate (IPDI), or Methylene bis(4-cyclohexylisocyanate) (H12MDI or Hydrogenated MDI), a Methylene diphenyl diisocyanate (MDI), a polymeric MDI, a Toluene diisocyanate (TDI) or a Naphthalene diisocyanate (NDI).

8. The process of claim 1, wherein the lignin-isocyanate mixture further comprises at least one additive which is a viscosity reducer, a surfactant, a flame retardant, a blowing agent or any mixture thereof.

9. The process of claim 2, wherein the catalyst is a metal catalyst, an amine catalyst or a mixture thereof.

10. The process of claim 2, wherein the polymerization reaction is performed by mixing the lignin-isocyanate mixture with the resin comprising the at least one polyol, the resin further comprising the at least one catalyst.

11. The process of claim 2, wherein the polyol is an aliphatic polyester or polyether polyol, an aromatic polyester polyol, a halogenated polyether polyol, polyethylene glycol, a sucrose based polyether polyol, an amine based polyether polyol, a sucrose/amine based polyether polyol, a toluenediamine based polyol, a Mannich based polyol, a (polytetramethylene glycol) polyol (PTMEG), an acrylic polyol, a phenolic polyol, a lignopolyol, a biopolyol extracted from the biomass, or a mixture thereof.

12. The process of claim 2, wherein the resin further comprises at least one additive comprising a surfactant, a flame retardant, a blowing agent, water, an antimicrobial agent, a pigment, a fragrance, an UV light stabilizer, a crosslinker, a chain extender or mixtures thereof.

13. The process of claim 2, wherein the polymerization reaction is performed in the presence of mineral or organic charges comprising wood particles, wood fibers, cellulose, nanocellulose, cement, clays, glass fibers, calcium carbonate, or other particulate materials.

14. The process of claim 2, wherein the polymerization reaction is performed by heating the lignin-isocyanate mixture, adding the at least one catalyst to the lignin-isocyanate mixture under heating, or by mixing the lignin-isocyanate mixture with the resin under heating, the heating being performed at a temperature between about 30° C. and about 90° C.

15. The process of claim 14, wherein the heating is performed at a temperature between about 50° C. and about 70° C.

16. A mixture comprising at least one dried lignin and at least one isocyanate compound for use in the production of a lignin based polyurethane product,
wherein the mixture is solvent-free, the at least one isocyanate compound comprises at least two isocyanate groups and the at least one dried lignin has a water content of less than 1 wt %.

17. The mixture of claim 16, wherein the dried lignin is present in the mixture in an amount of about 1 wt % to about 50 wt.

18. The mixture of claim 16, wherein the dried lignin is present in the mixture in an amount of about 10 wt % to about 40 wt %.

19. The mixture of claim 16, wherein the dried lignin is present in the mixture in an amount of about 20 wt % to about 35 wt %.

20. The mixture of claim 16, wherein the lignin is a lignosulfonate, a kraft lignin, an organosolv lignin, a soda lignin, an electrochemically separated lignin from black liquor or mixtures thereof.

21. The mixture of claim 16, wherein the isocyanate compound comprises Hexamethylene diisocyanate (HDI), Isophorone diisocyanate (IPDI), or Methylene bis(4-cyclohexylisocyanate) (H12MDI or Hydrogenated MDI), a Methylene diphenyl diisocyanate (MDI), a polymeric MDI, a Toluene diisocyanate (TDI) or a Naphthalene diisocyanate (NDI).

22. The mixture of claim 16, further comprising a viscosity reducer, a surfactant, a flame retardant, a blowing agent, mineral or organic charges or a mixture thereof.

23. The process of claim 1, wherein the at least one lignin is a lignosulfonate, a kraft lignin, an organosolv lignin, a soda lignin, an electrochemically separated lignin from black liquor or any mixture thereof, and the isocyanate compound comprises 2,2' Methylene diphenyl diisocyanate (MDI), 2,4'-MDI, 4,4'-MDI or a mixture thereof or a polymeric MDI.

24. A process for the production of a lignin based polyurethane product comprising:
drying at least one lignin to obtain at least one dried lignin with a moisture content of less than 1 wt %,
preparing a lignin-isocyanate mixture by mixing the at least one dried lignin and at least one isocyanate compound comprising at least two isocyanate groups, and
mixing the lignin-isocyanate mixture with a resin comprising at least one polyol in the presence of at least one catalyst, to form the lignin based polyurethane product,
wherein the lignin-isocyanate mixture is solvent-free and the obtained dried lignin is present in the lignin-isocyanate mixture in an amount of about 10 wt % to about 40 wt %.

25. The mixture of claim 16, wherein the lignin is a lignosulfonate, a kraft lignin, an organosolv lignin, a soda lignin, an electrochemically separated lignin from black liquor or any mixture thereof, and the isocyanate compound comprises 2,2' Methylene diphenyl diisocyanate, 2,4'-MDI, 4,4'-MDI or a mixture thereof or a polymeric MDI.

26. The mixture of claim 16, further comprising mineral or organic charges comprising wood particles, wood fibers, cellulose, nanocellulose, cement, clays, glass fibers, calcium carbonate, or any mixture thereof.

* * * * *